(12) United States Patent
Matsushima

(10) Patent No.: US 6,344,873 B1
(45) Date of Patent: Feb. 5, 2002

(54) FILM READING APPARATUS AND METHOD

(75) Inventor: Hiroshi Matsushima, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/244,071

(22) Filed: Feb. 4, 1999

(30) Foreign Application Priority Data

Feb. 10, 1998 (JP) .......................................... 10-028419

(51) Int. Cl.⁷ .............................................. H04N 5/253
(52) U.S. Cl. ......................... 348/96; 396/311; 396/319
(58) Field of Search .......................... 348/96; 396/311, 396/319; 360/3; H04N 5/253

(56) References Cited

U.S. PATENT DOCUMENTS

| 6,094,541 A | * | 7/2000 | Alexandre et al. | .......... 396/319 |
| 6,185,377 B1 | * | 2/2001 | Taka et al. | .................. 396/319 |
| 6,188,463 B1 | * | 2/2001 | Kodama | ....................... 348/96 |
| 6,249,397 B1 | * | 6/2001 | Sasaki | .......................... 396/319 |
| 6,266,487 B1 | * | 7/2001 | Sasaki et al. | ................ 396/319 |

FOREIGN PATENT DOCUMENTS

JP          8-228311        9/1996        .......... H04N/5/253

* cited by examiner

*Primary Examiner*—Howard Britton
(74) *Attorney, Agent, or Firm*—Fitzpatrick, Cella, Harper & Scinto

(57) ABSTRACT

A film reading apparatus includes a reading unit for reading a bit string magnetically recorded on a loaded film, a bit string information recording unit for recording the bit string read by the reading unit, and a collation unit for collating the bit string read by the reading unit with the bit string recorded in the bit string information recording unit. An identical film determination unit determines that the same film as the previously loaded film is loaded, in a case that the collation result obtained by the collation units indicates that the bit strings coincide with each other. The loaded film can automatically return to the previously loaded state.

16 Claims, 10 Drawing Sheets

UNUSED

IN USE

USED (UNDEVELOPED)

DEVELOPED

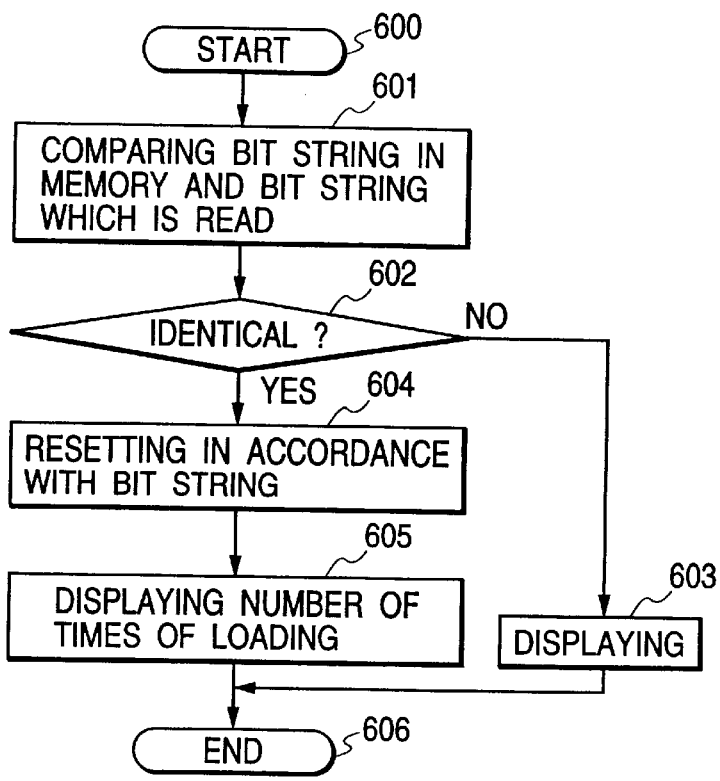
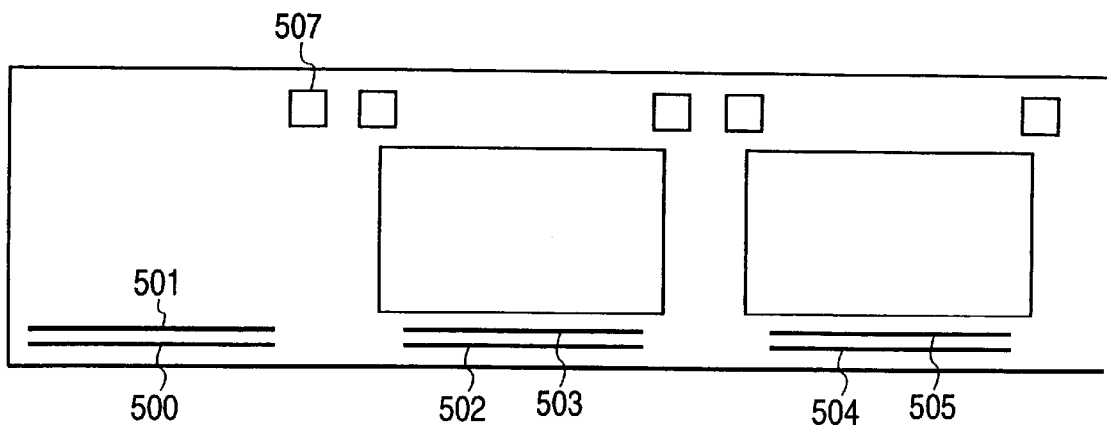

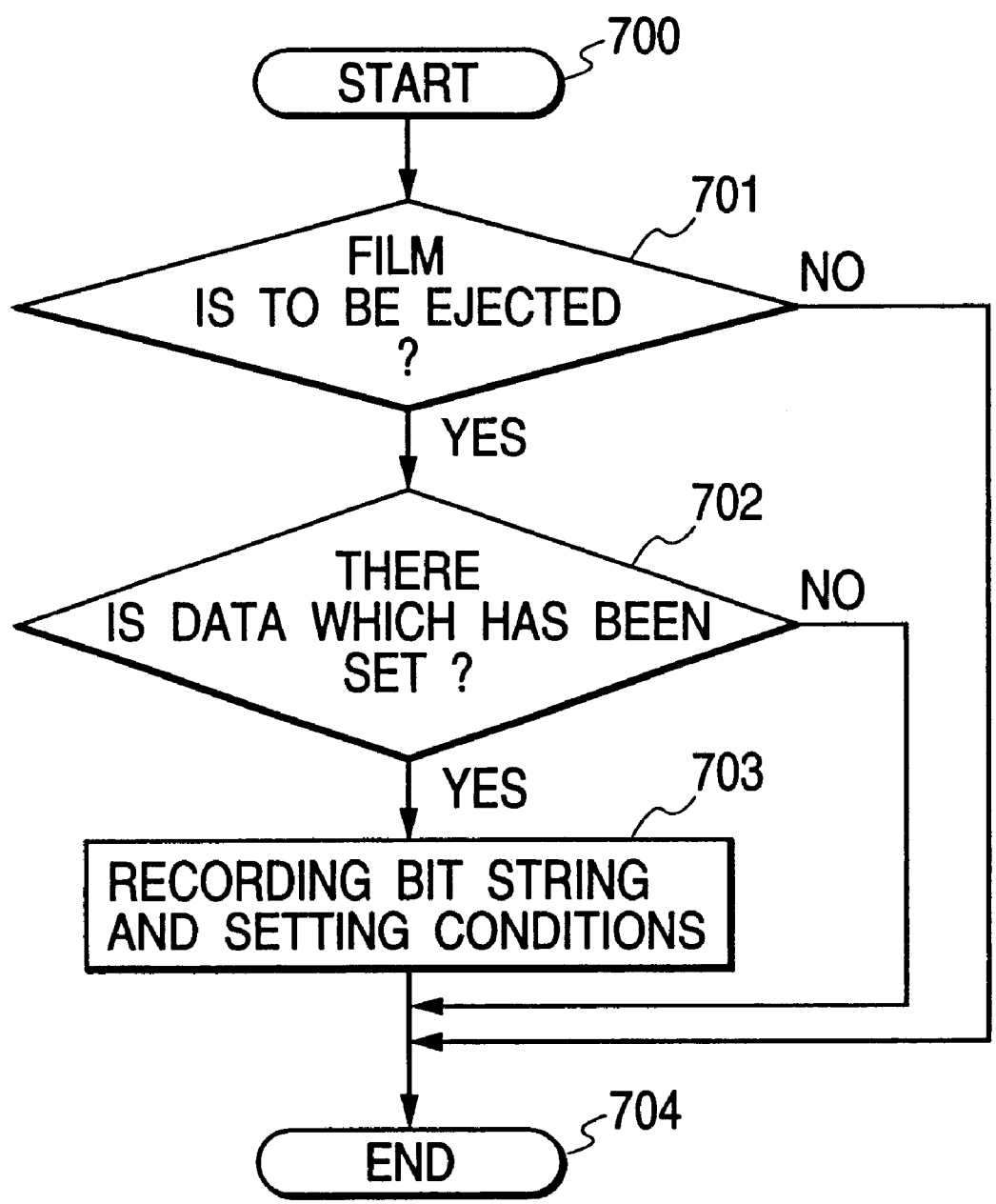

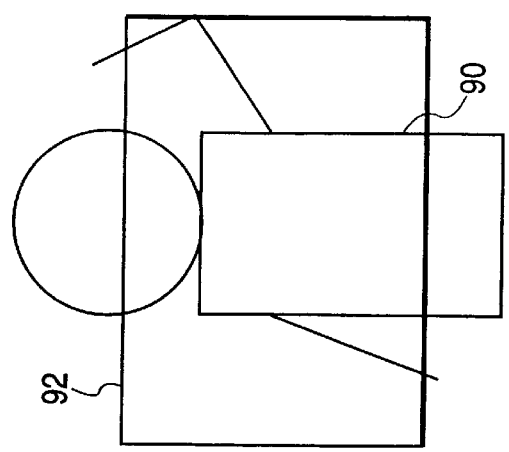
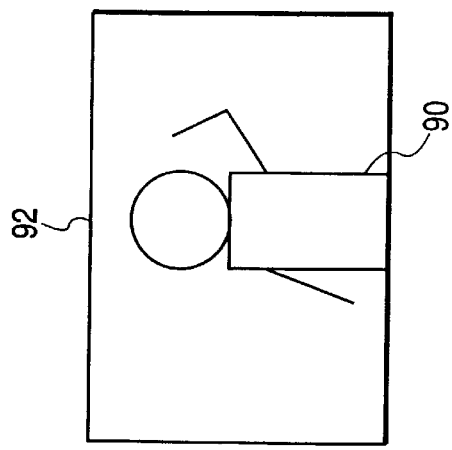
FIG. 10A
FIG. 10B

FILM READING APPARATUS AND METHOD

BACKGROUND OF THE INVENTION

1. Field of the Invention

The present invention relates to a film reading apparatus for reproducing the images recorded on a film on which accompanying information can be recorded together with the images.

2. Related Background Art

In a conventional film reproduction apparatus, each loaded film is checked by reading the ID code added to the film. This ID code requires a dedicated sensor for reading the numbers and bar code information printed on a cartridge or the bar code information imprinted on a film. The addition of the sensor therefore has become a large factor that increases the cost.

In automatic slide show reproduction, zooming is performed with a predetermined magnification change regardless of magnification used in photographing and photographed frame size (aspect ratio). For example, a technique of determining the start and end magnifications of zooming in accordance with the object distance and the focal length of a photographing lens has been proposed in Japanese Laid-Open Patent Application No. 08-228311. Consider a film image for which a plurality of frame sizes (aspect ratios) can be set as in the case with IX240 films. In this case, since the optimal end zoom magnification varies with frame sizes (aspect ratios), it is difficult to present zooming with the optimal zoom magnifications in the automatic slide show reproduction.

SUMMARY OF THE INVENTION

It is an object of the present invention to automatically restore the reproduced state set upon previous loading of a film without adding any dedicated sensor.

According to an aspect of the present invention, there is provided a film reading apparatus comprising a reading unit for reading a bit string recorded on a first loaded film, a memory for storing the bit string read by the reading unit, a detection unit for detecting that a second film is loaded after the first film is unloaded, and a collation unit for, in a case that loading of the second film is detected by the detection unit, making the reading unit read a bit string stored on the second loaded film, and collating the read bit string on the second film with the bit string on the first film which is stored in the memory. A determination unit determines, in a case that the bit strings on the first and second films, which are collated with each other by the collation unit, coincide with each other, that the previously loaded first film is identical to the currently loaded second film.

This arrangement allows restoration of the reproduced state set upon previous loading of a film without adding any dedicated sensor.

Other objects, features, and advantages of the present invention will be apparent from the following description and accompanying drawings.

BRIEF DESCRIPTION OF THE DRAWINGS

FIG. 4 is a flow chart showing the operation of this embodiment;

FIG. 5 is a view for explaining magnetic information tracks of a film;

FIG. 7 is a flow chart showing the operation of another embodiment;

FIGS. 10A and 10B are views showing an example of zoom display with the high-vision size.

DETAILED DESCRIPTION OF THE PREFERRED EMBODIMENTS

The first embodiment of the present invention will be described below. In this embodiment, the bit string magnetically recorded on a film is compared with the bit string stored in a memory to automatically reset the film to the state set upon previous loading of the film.

Figure 1:
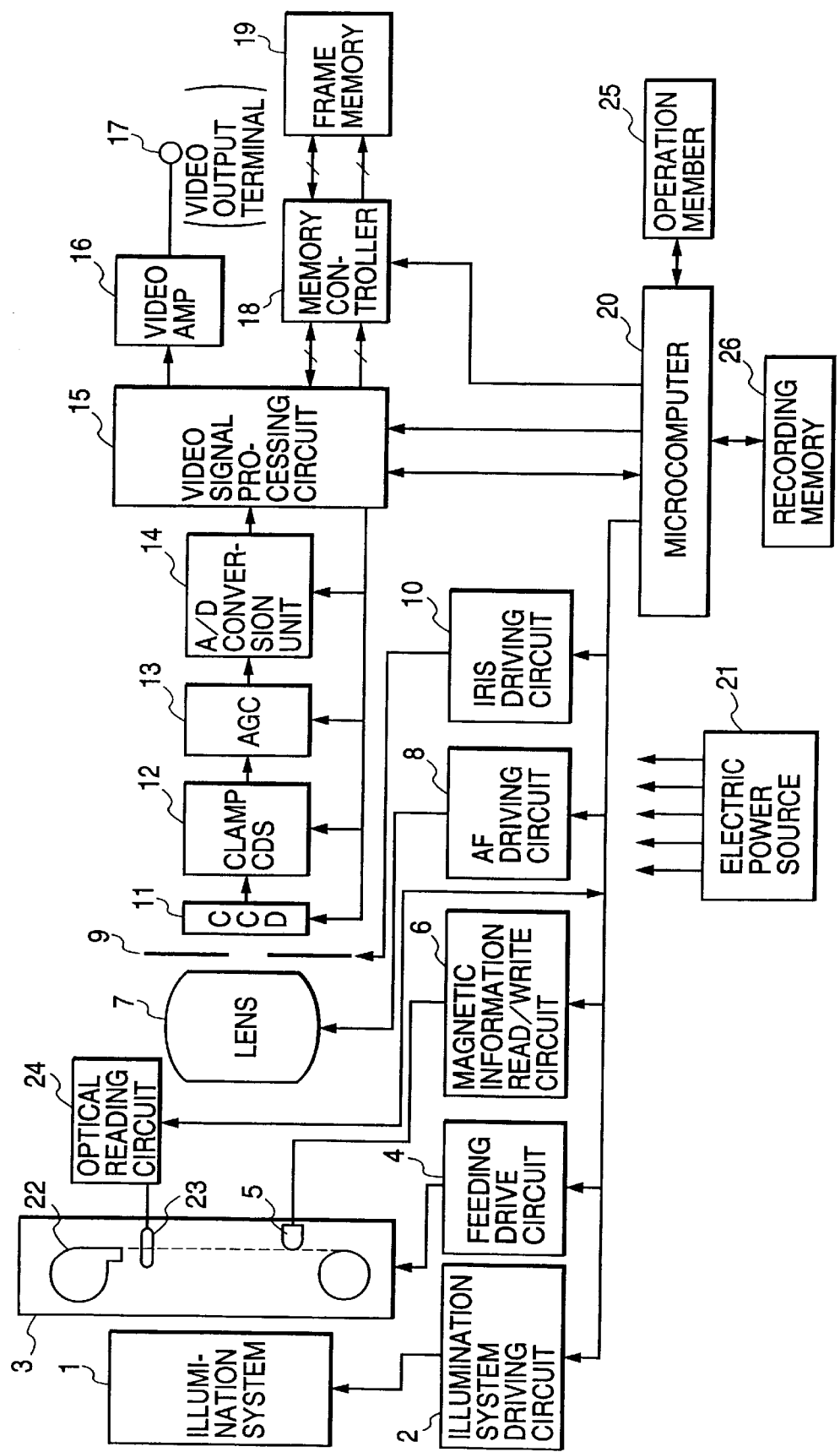
FIG. 1 is a block diagram showing an arrangement of a film image reproduction apparatus.

FIG. 1 is a block diagram for explaining the schematic arrangement of a film image reproduction apparatus according to the present embodiment. Referring to FIG. 1, an illumination system 1 is located on the opposite side of a CCD 11 to a film. The illumination system 1 is driven in response to an instruction from a microcomputer 20 to illuminate the film.

A feeding drive circuit 4 extracts a developed film from a cartridge 22 and feeds the extracted film to a predetermined position under the control of the microcomputer 20.

The feed position is controlled by detecting perforations in the film using an optical detection element 23 and an optical reading circuit 24.

A magnetic information read/write circuit 6 is controlled by the microcomputer 20 to read the magnetic information recorded on an undeveloped film and write magnetic information thereon by using a head unit 5.

The magnetic bits read by the head unit 5 are decoded as IX information and are also used as bit string information used to check each film. In general, since different bit strings are recorded on different films, the above bit string information can be used as a film ID.

As an image pickup element (the element 11 shown in FIG. 1), a CCD or the like is used. The film image formed on the CCD 11 through an optical lens 7 is photoelectrically converted to be extracted as an electrical signal.

A clamp CDS 12 and an AGC 13 perform basic analog processing before A/D conversion. The clamp level of the clamp CDS 12 and the reference level of the AGC 13 can be changed by the microcomputer 20.

An A/D conversion unit 14 converts an analog CCD output signal into a digital signal. A video signal processing circuit 15 performs filtering, color conversion, and gamma/knee processings on the digital CCD image data, and outputs the resultant data to a memory controller 18.

This video signal processing circuit 15 also incorporates therein a D/A conversion unit (not shown) and can convert the video signal input from the CCD 11 or the image data input from the memory control circuit 18 into an analog signal. This analog signal can be output to a monitor or the like through a video output terminal 17 of a video amplifier 16.

These functions of the video signal processing circuit 15 are switched by data exchange with the microcomputer 20. Exposure information, focus information, and white balance information for the CCD output signal can be output from the video signal processing circuit 15 to the microcomputer 20, as needed. The microcomputer 20 performs white balance and gain adjustment on the basis of these pieces of information.

The memory controller 18 stores the digital image data input from the video signal processing circuit 15 in a frame memory 19, and outputs image data from the frame memory 19 to the video signal processing circuit 15.

The memory controller 18 described above also thins out image information and transfers the resultant information to the frame memory 19 during loading of index window display in accordance with an instruction from the microcomputer 20.

The frame memory 19 is an image memory capable of storing at least data corresponding to an index window and one or more general display windows. In general, a VRAM, an SRAM, a DRAM, or an SDRAM is used. In this embodiment, fixed image data such as character data can be stored in this memory in addition to the image data read by the CCD 11.

An iris driving circuit 10 changes the optical aperture value of an iris 9 such as an auto iris under the control of the microcomputer 20. For example, an AF (Auto Focus) driving circuit 8 is implemented by a stepping motor. The AF driving circuit 8 changes the position of the focus lens (not shown) in the lens 7 to focus the lens on the film under the control of the microcomputer 20. An electric power source 21 supplies necessary power to each IC and driving system.

An operation member 25 transfers information corresponding to the operation state to the microcomputer 20. The microcomputer 20 controls each unit in accordance with a change in the state of the operation member 25. For example, the operation member 25 is used to set an frame not to be reproduced, input a program for program reproduction, perform zooming, select a reproduction mode, perform automatic white balance adjustment, and perform manual brightness adjustment.

A recording memory 26 is a memory whose recorded contents are not erased when the power is turned off, e.g., an EEPROM, which stores bit strings for film checking and setting values for reproduction in pairs.

The operation of the film image reproduction apparatus of the present embodiment will be briefly described next with reference to the flow chart of FIG. 2.

First of all, when the processing is started in step 300, it is checked in step 301 whether an IX240 film is loaded into this apparatus. If it is determined in step 301 that no film is loaded, the processing is terminated. If it is determined that a film is loaded, the flow advances to step 302 to perform reproduction.

In step 302, a data disk 4b and a developed state indication tab 4a in FIGS. 3A to 3D are checked to determine whether the film is a developed film, a color negative film, a color positive film, a monochrome film, or a cleaning cartridge. This check is performed by using, for example, a switch or photoreflector (not shown).

If the check result in step 302 indicates in step 303 that the film is an undeveloped film, reproduction is inhibited, and the processing is terminated. If the film is a developed film, the flow advances to step 304.

In step 304, the feed driving circuit 4 opens the cover of the film cartridge to pull out the film, and the images of all the frames are read by the CCD 11. At the same time, the IX data (magnetically recorded information) of all the frames are loaded by the magnetic information read/write circuit 6.

The image data read by the CCD 11 suffices to be coarse data because they are used for an index window. For this reason, the image data is stored in the frame memory 19 after the data amount is decreased by thinning-out processing. In this case, a dedicated area for storing the index window data is ensured in the frame memory 19. Ensuring such a dedicated area obviates the necessity of reading the images of all the frames every time an index window is displayed.

In step 305, the image data loaded in step 304 is output as index image data to the video amplifier 16.

The flow then advances to step 306 to check whether any data is input from the operation member 25.

The flow advances to step 307 to check whether the check result in step 306 indicates any change in input.

If it is determined that there is a change, the flow advances to step 308. Otherwise, the flow returns to step 306.

In step 308, an image is read by the CCD 11, and the reproducing modes of reproducing read images are switched in accordance with the change of the operation member 25. For example, a programmed automatic reproduction mode and a mode of reproducing frames one by one, and the like are switched. In the frame-by-frame reproduction mode, frame feed is performed. An index window display request is checked in step 309.

In this case, the photography data, title, date, and the like included in the IX data are displayed in accordance with a request. In addition, in accordance with the IX data, the direction of an image is changed, the aspect ratio is switched/changed, a program is set, zooming is set, a frame for which no photography is to be performed is set, or white balance brightness is adjusted, and the display is switched accordingly.

In step 309, it is checked whether an index window display request is generated. If YES in step 309, the flow returns to step 305 to display an index window. If NO in step 309, the flow advances to step 310.

In step 310, it is checked whether a film removal request is generated. If NO in step 310, the flow returns to step 306. If YES in step 310, the flow advances to step 311 to rewind the film into the cartridge 22.

In step 311, the film is rewound into the cartridge 22 by the feed driving circuit 4, the position of the data disk is set to the "developed" position, and the cover of the cartridge 22 is closed, thereby allowing removal of the film. In addition, information is magnetically recorded on the film by using the magnetic information read/write circuit 6 and the head unit 5, as needed, while the film is rewound.

In step 312, a bit string for a film check and the state set in step 308 are recorded in the recording memory 26. The flow then advances to step 313 to terminate the processing.

Check processing for a film using a bit string as IX magnetic information loaded in step 304 will be described with reference to the flow chart of FIG. 4 and the magnetic information tracks shown in FIG. 5. FIG. 5 shows magnetic information tracks of the film. References 500 and 501 denote leader magnetic information. Track information 500, 502, and 504 are identical to each other. Track information 501, 503, and 505 are identical to each other. Reference 507 denotes perforations for film feeding.

When the processing is started in step 600, the flow advances to step 601 to handle the magnetic information read in step 304 as a bit string of "0" and "1" independently of IX information so as to check whether an identical bit string is stored in the recording memory 26.

In this case, the above bit string may include all the bits written in the film. In consideration of a memory to be used to record information, however, the bits may be limited to the tracks 500, 502, 504, . . . in FIG. 5, or may be limited to the leader information 500 and information corresponding to a predetermined number of frames.

In some cases, the same IX magnetic information is written a plurality of number of times to prevent errors. For this reason, identical information may be handled as one bit string on the basis of decision by majority, thereby shortening the bit string.

If it is determined in step 602 that no identical bit string is found, the flow advances to step 603. If an identical bit string is found, the flow advances to step 604 to reset a setting value corresponding to the bit string.

In step 603, since no identical bit string exists, information indicating that this film is loaded into the apparatus for the first time is displayed on the screen. Depending on the mode, setting is required first. In this case, a setting window is displayed.

When the flow advances to step 604, the setting value recorded together with the bit string in the recording memory 26 is set. With this operation, this film can automatically return to its previous loaded state. This obviates the necessity to perform the same setting again as in the prior art.

In step 605, the number of times of loading of the same film is recorded in the recording memory 26 and displayed on the screen. This display indicates, for example, the information "This film has been loaded 10 times".

After the above operation, the processing is terminated in step 606.

The concept of the present embodiment will be described next with reference FIGS. 6A and 6B.

Figure 6A:
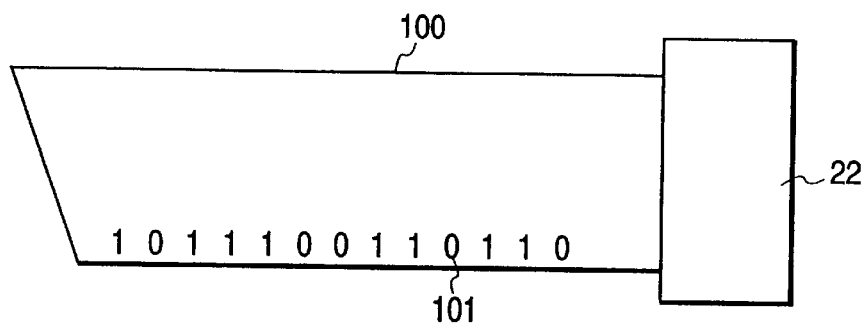
FIGS. 6A and 6B are views schematically showing bit information recorded on the film.

FIG. 6A is a conceptual rendering of a film. A bit string 101 is magnetically recorded on a film 100. FIG. 6A also shows the cartridge 22.

Figure 6B:
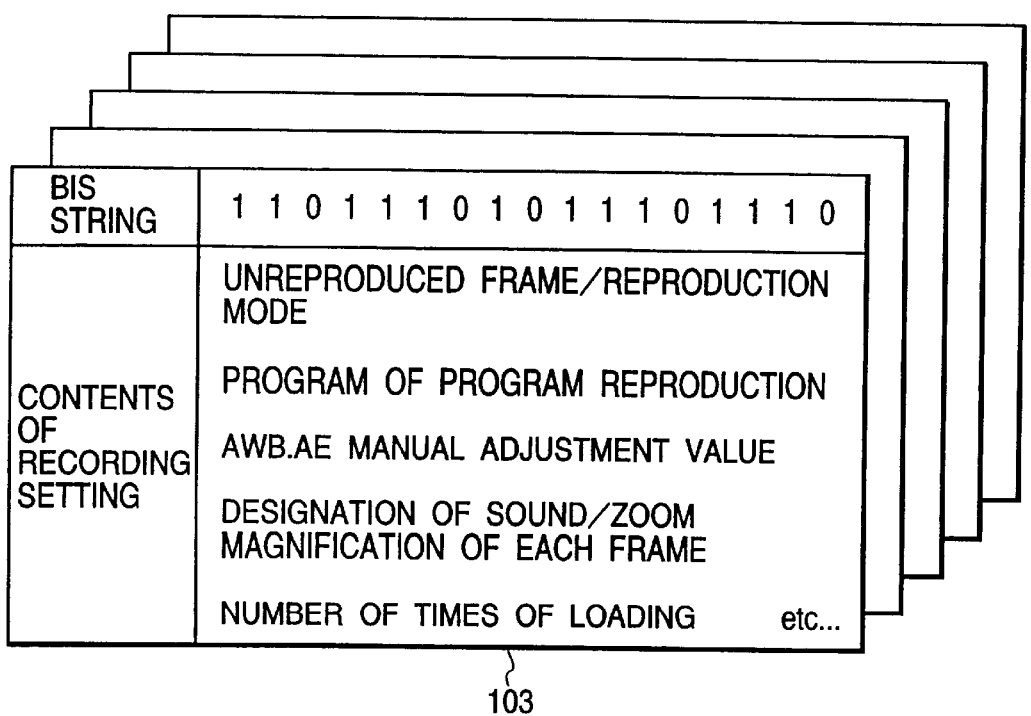

FIG. 6B is a conceptual rendering of data on the recording memory 26. Bit stings used to identify films and setting information of this apparatus, which correspond to the bit strings, are recorded in pairs. If there is a bit string identical to a read bit string, the set state of the apparatus which corresponds to the bit string is automatically reset, thereby allowing the film to automatically return its previous loaded state. This function is a characteristic feature of the apparatus of this embodiment.

As described above, with the use of the technique of the present embodiment, a reproduction state suited to a given film need not be set every time the film is loaded, unlike in the prior art. In the present embodiment, when a film is loaded, the film can automatically return to its previous loaded state. This allows implementation of an easy-to-use film image reproduction apparatus without adding any dedicated reading unit for reading film IDs.

The second embodiment designed to prevent unnecessary consumption of a recording memory 26 mounted in the apparatus.

FIG. 7 is a flow chart for explaining a procedure in the present embodiment.

When the processing is started in step 700, it is checked in step 701 whether a loaded film is to be ejected. If it is determined that the film is not to be ejected, the flow advances to step 704 to terminate the processing.

If it is determined in step 701 that the film is to be ejected, the flow advances to step 702. In step 702, it is checked whether the user has set any data in film reproduction. If it is determined that no data has been set, the flow advances to step 704 without recording any bit string and setting value. If it is determined that data has been set, the flow advances to step 703 to record a bit string and a set value.

In step 703, as shown in FIG. 6B, the bit string and the corresponding set state are recorded in the recording memory 26. After the above operation, the processing is terminated in step 704.

According to this embodiment, unnecessary consumption of the recording memory mounted in the apparatus can be prevented.

In the above embodiment, a reading means for reading a magnetic bit string recorded on a film is a head unit 5, and a recording means for recording the bit sting is the recording memory 26. The loaded bit string is collated with the bit string recorded in the recording means by a collation means as a function implemented by a microcomputer 20 in step 601.

If it is determined that the bit strings coincide with each other, it is determined that the same film is loaded into the apparatus, and the reproduction information recorded upon previous loading of the film is automatically set. This operation is performed by the function implemented by the microcomputer 20 in step 604.

The present invention is not limited to the arrangements of the embodiments described above. Any arrangement that can implement the functions of the embodiments can be used.

The third embodiment of the present invention will be described next.

Figure 8:
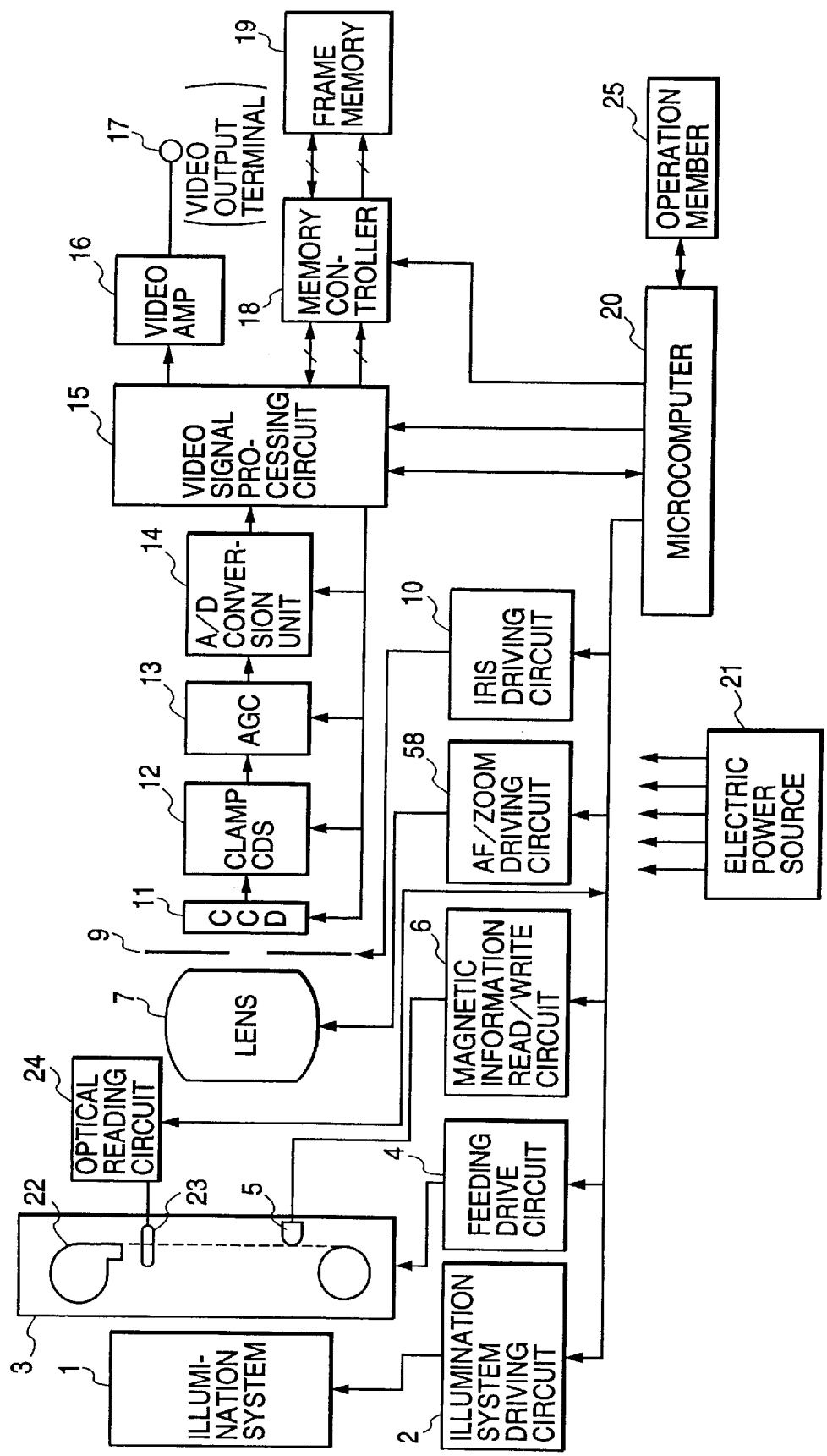
FIG. 8 is a block diagram showing an arrangement of a film image reproduction apparatus.

FIG. 8 is a block diagram showing the arrangement of a film image reproduction apparatus according to the third embodiment. The same reference numerals in FIG. 8 denote the same parts as in FIG. 1, and a detailed description thereof will be omitted.

As shown in FIG. 8, in the present embodiment, an AF/zoom driving circuit 58 is used in place of the AF driving circuit 8 in FIG. 1. A recording memory 26 is not shown because the memory is not required to describe the operation of the film image reproduction apparatus of this embodiment.

For example, the AF/zoom driving circuit 58 in the present embodiment is implemented by a stepping motor. The AF/zoom driving circuit 58 changes the position and magnification of the focus lens in a lens 7 to change the magnification and focus the lens on a film under the control of a microcomputer 20. This zooming operation is also used for automatic reproduction.

Figure 2:
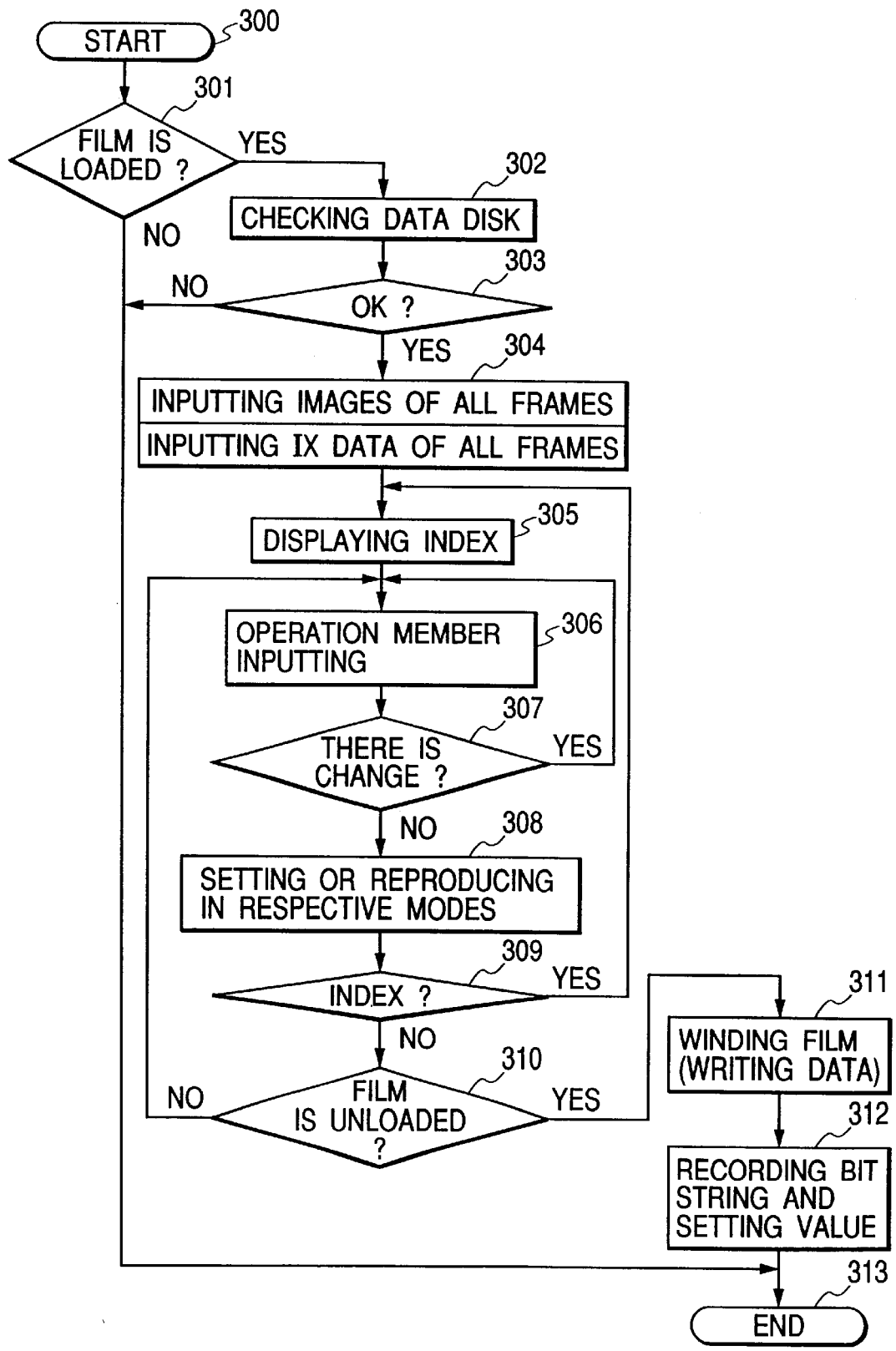
FIG. 2 is a flow chart showing the operation of an embodiment of the present invention.
Figure 3A:
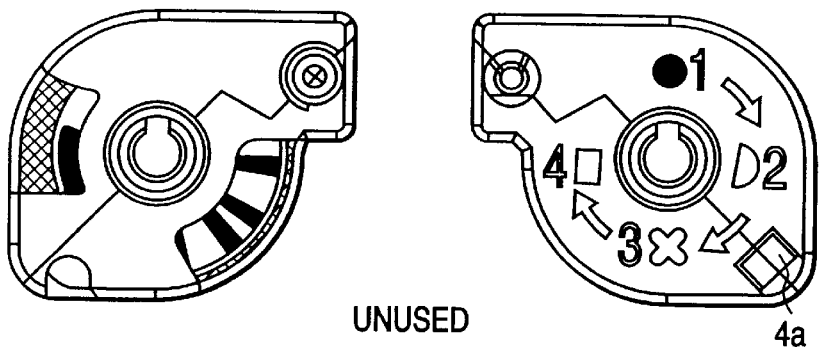
FIGS. 3A, 3B, 3C and 3D are views for explaining the state of a film cartridge.
Figure 3B:
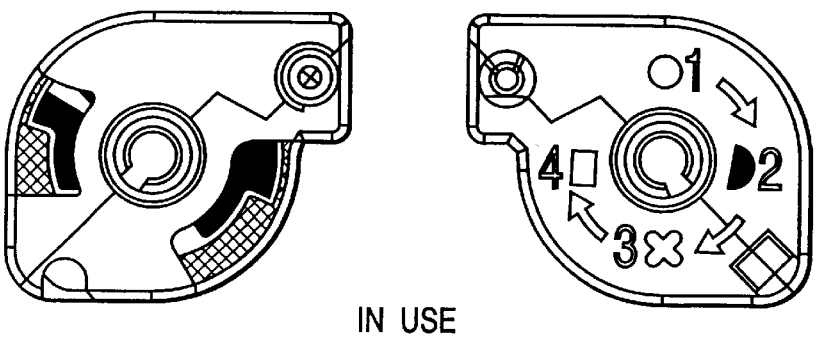
Figure 3C:
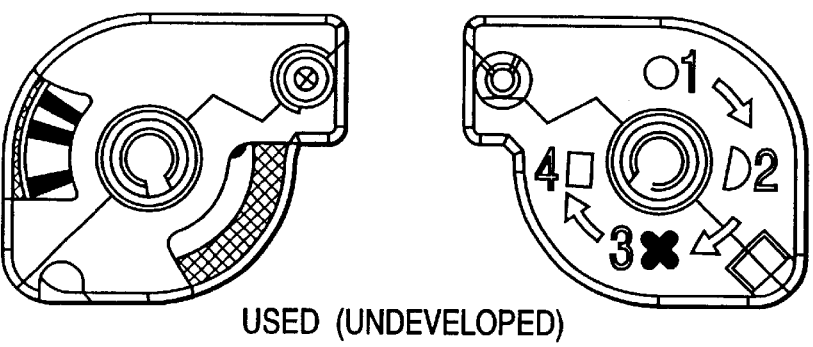
Figure 3D:
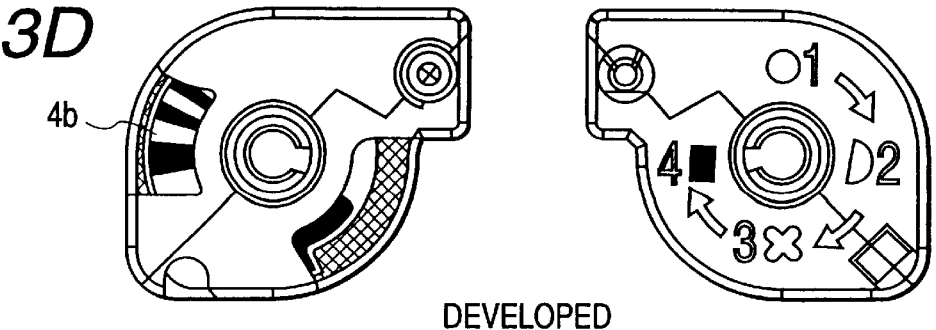
Figure 9:
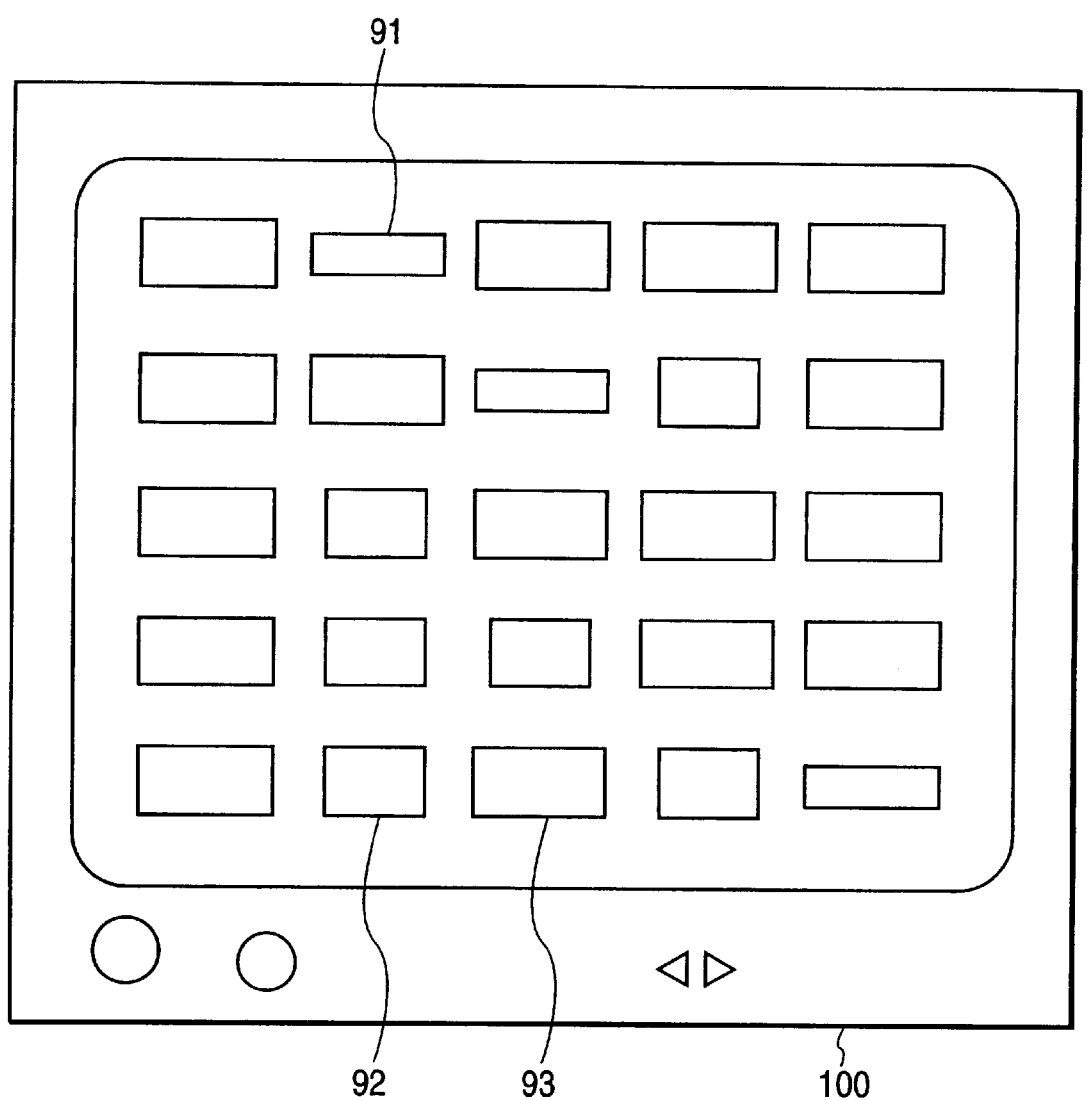
FIG. 9 is a view showing a case wherein images are displayed on a display screen on the basis of the aspect ratio information of each image.

The film image reproduction apparatus of the present embodiment having this arrangement operates in accordance with the same procedure as in the flow chart of FIG. 2. In the present embodiment, index display in step 305 is performed on a display screen 100 on the basis of the image aspect information (panorama/classic/high-vision) contained in magnetic information, as shown in, for example, FIG. 9. Images 91, 92, and 93 respectively have panorama, classic, and high-vision sizes. When a 40 exposure film is used, an image is displayed across two frames.

In the present embodiment as well, in step 308 in FIG. 2, reproduction is performed in accordance with each mode. In this case, the display is switched in accordance with a change in direction and aspect switching. In the automatic reproduction mode, the zoom magnification to be used to present each image is determined on the basis of the image magnification information and aspect information of the corresponding frame read in step 304.

Figure 11A:
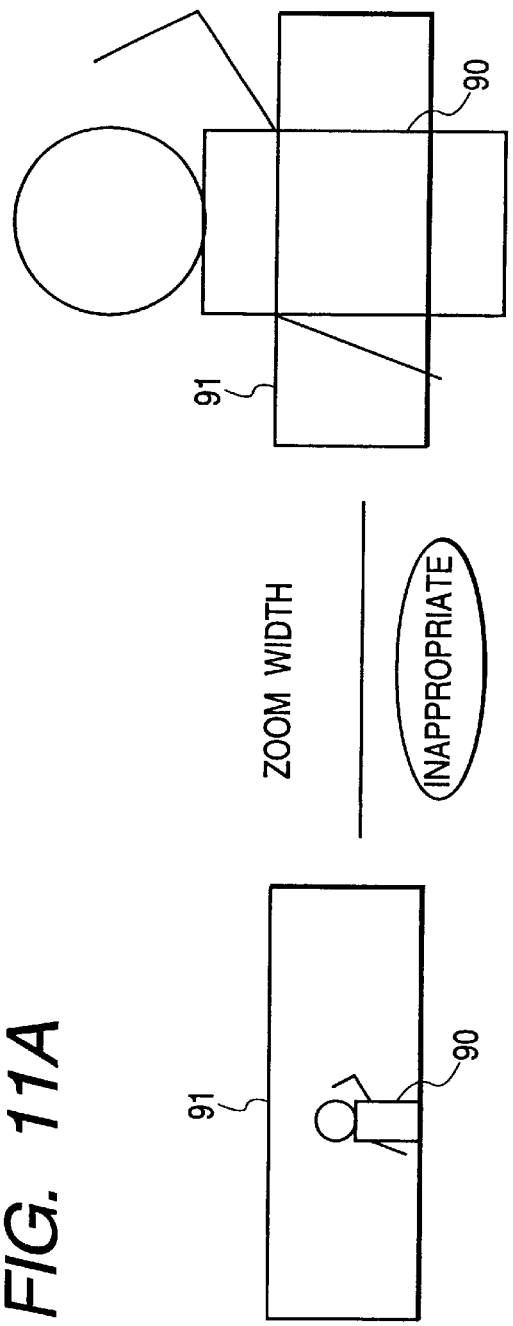
FIGS. 11A and 11B are views showing an example of zoom display with the panorama size.
Figure 11B:
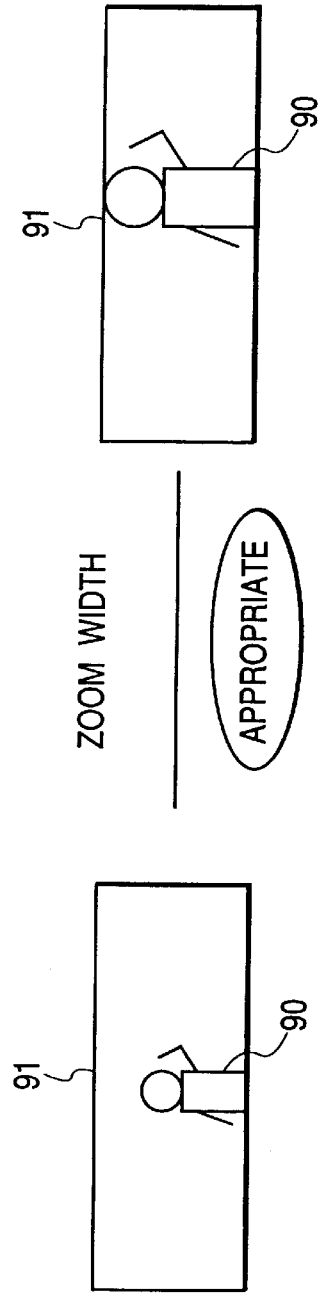

The function and effect of the film image reproduction apparatus of this embodiment will be described next with reference to FIGS. 10A and 10B and FIGS. 11A and 11B. FIGS. 10A and 10B show cases associated with the high-vision size. FIGS. 11A and 11B show cases associated with the panorama size.

As is obvious from the comparison between FIGS. 10A and 10B and FIGS. 11A and 11B, when zooming of an object 90 is to be performed, the optimal zoom magnification varies with aspect ratios.

As described above, the magnetic information recorded on a loaded film is read, together with the images recorded on the film, and the read images are displayed on a TV receiver. In addition, when zoom display is to be performed, the maximum zoom magnification is limited on the basis of the image magnification information and aspect ratio information in the magnetic information recorded on the film. In the above zooming operation, the main object can be prevented from protruding from the frame. This can realize automatic slide show reproduction that allows presentation of photographic images by zooming with optimal zoom magnifications for the images.

Many widely different embodiments of the present invention may be constructed without departing from the spirit and scope of the present invention. It should be understood that the present invention is not limited to the specific embodiments described in the specification, except as defined in the appended claims.

What is claimed is:

1. A film reading apparatus comprising:
   (a) a reading unit for reading a bit string recorded on a first loaded film;
   (b) a memory for storing said bit string read by said reading unit;
   (c) a detection unit for detecting that a second film is loaded after said first film is unloaded;
   (d) a collation unit for, in a case that loading of said second film is detected by said detection unit, making said reading unit read a bit string stored on said second loaded film, and collating said read bit string on said second film with said bit string on said first film which is stored in said memory; and
   (e) a determination unit for determining, in a case that said bit strings on said first and second films, which are collated with each other by said collation unit, coincide with each other, that said previously loaded first film is identical to said currently loaded second film.

2. An apparatus according to claim 1, wherein said bit string is magnetically recorded on a film.

3. An apparatus according to claim 1, wherein said collation unit performs collation of said bit string by using a predetermined number of bits.

4. An apparatus according to claim 1, wherein said collation unit performs collation of said bit string with respect to a predetermined track.

5. An apparatus according to claim 1, further comprising a reproduction unit for reproducing an image on said film.

6. An apparatus according to claim 5, wherein said memory further stores a reproduction condition under which said reproduction unit performs reproduction.

7. An apparatus according to claim 6, wherein said reproduction unit reproduces an image on said film in accordance with the reproduction condition stored in said memory in a case that said determination unit determines that said first film is identical to said second film.

8. An apparatus according to claim 6, wherein said memory stores the reproduction condition and said bit string as a set.

9. An apparatus according to claim 7, wherein the reproduction condition is a program for reproduction.

10. An apparatus according to claim 7, wherein the reproduction condition is display of photography data, a title, or a date.

11. An apparatus according to claim 7, wherein the reproduction condition is an orientation of an image.

12. An apparatus according to claim 7, wherein the reproduction condition is an aspect ratio.

13. An apparatus according to claim 7, wherein the reproduction condition is zooming.

14. An apparatus according to claim 7, wherein the reproduction condition is setting information of a frame to be reproduced.

15. An apparatus according to claim 7, wherein the reproduction condition is exposure control.

16. A film reading method comprising the steps of:
   (a) reading a bit string recorded on a first loaded film;
   (b) storing said read bit string;
   (c) detecting that a second film is loaded after said first film is unloaded;
   (d) in a case that loading of said second film is detected, reading a bit string stored on said second loaded film, and collating said read bit string on said second film with said bit string on said first film which is stored in said memory; and
   (e) determining that said previously loaded first film is identical to said currently loaded second film, in a case that said bit strings on said first and second films, which are collated, coincide with each other.

* * * * *

UNITED STATES PATENT AND TRADEMARK OFFICE
CERTIFICATE OF CORRECTION

PATENT NO.     : 6,344,873 B1                                        Page 1 of 1
DATED          : February 5, 2002
INVENTOR(S)    : Hiroshi Matsushima It is certified that error appears in the above-identified patent and that said Letters Patent is hereby corrected as shown below:

<u>Column 8,</u>
Line 25, "display" should read -- a display --.

Signed and Sealed this

Twenty-third Day of July, 2002

Attest:

Attesting Officer

JAMES E. ROGAN
Director of the United States Patent and Trademark Office